United States Patent [19]

Peters et al.

[11] 4,338,815
[45] Jul. 13, 1982

[54] INDUCTIVE DISPLACEMENT TRANSDUCER

[75] Inventors: Klaus-Jürgen Peters, Affalterbach; Franz-Ulrich Bosch, Stuttgart; Herbert Schindler, Hemmingen; Hermann Nusser, Markgröningen, all of Fed. Rep. of Germany

[73] Assignee: Robert Bosch GmbH, Stuttgart, Fed. Rep. of Germany

[21] Appl. No.: 207,054

[22] Filed: Nov. 14, 1980

[30] Foreign Application Priority Data

Dec. 21, 1979 [DE] Fed. Rep. of Germany ....... 2951648

[51] Int. Cl.³ .......................................... G01M 15/00
[52] U.S. Cl. ........................................ 73/118; 336/30
[58] Field of Search ............... 73/118, 861.75; 336/30, 336/79, 133, 172

[56] References Cited

U.S. PATENT DOCUMENTS

| | | | |
|---|---|---|---|
| 1,292,334 | 1/1919 | Larsen | 73/861.75 X |
| 2,986,714 | 5/1961 | Smith | 336/30 |
| 3,495,456 | 2/1970 | Ohno | 336/30 X |

Primary Examiner—Jerry W. Myracle
Attorney, Agent, or Firm—Edwin E. Greigg

[57] ABSTRACT

An inductive displacement transducer is proposed which serves to convert a mechanical movement into an electrical signal and in particular, in order to measure the fuel consumption of an internal combustion engine, the transducer ascertains the movement of an air flow rate meter disposed in the intake tube of the engine. The displacement transducer includes a core comprising two E-shaped sets of arms disposed symmetrically relative to one another, of which one set of arms serves as the measuring arm set, the middle arm of which is surrounded on one end by a measuring magnetic coil and on the other end by a measuring short-circuit ring connected with the air flow rate meter, and the other set of arms acts as a reference arm set, the middle arm of which is surrounded on one end by a reference magnetic coil and on the other end by a fixed reference short-circuit ring. The measuring short-circuit ring is connected with a leaf spring, which is secured on the air flow rate meter.

7 Claims, 5 Drawing Figures

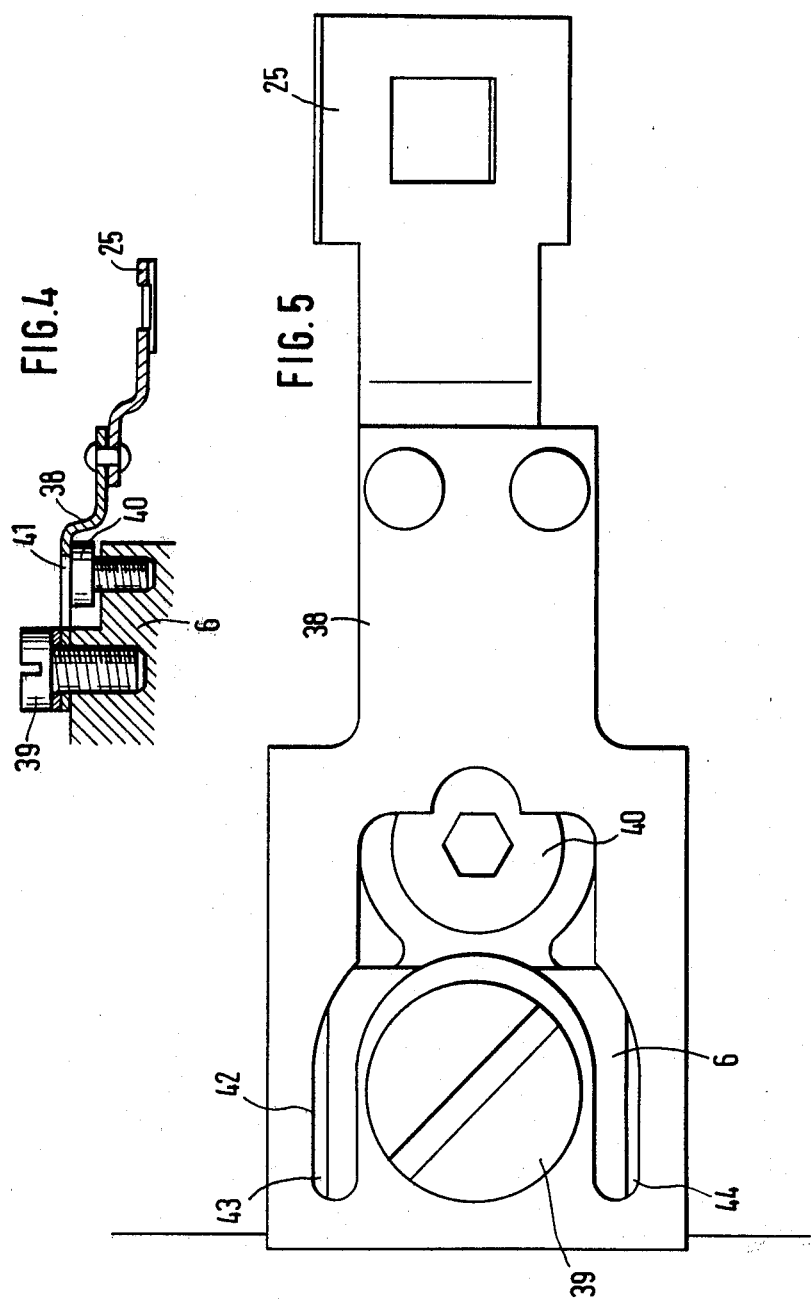

INDUCTIVE DISPLACEMENT TRANSDUCER

BRIEF SUMMARY OF THE INVENTION

The invention is related to an inductive displacement transducer as described by the claims.

BACKGROUND OF THE INVENTION

An inductive displacement transducer is already known, but in this known form it is not suited to meeting the demands placed on such a displacement transducer when installed in a motor vehicle.

OBJECTS AND SUMMARY OF THE INVENTION

The displacement transducer according to the invention and having the characteristics of the claims has the advantage over a prior art in that it very substantially reduces the influence of temperature fluctuations on the measurement product. As a result of the characteristics disclosed in the dependent claims, advantageous modifications of and improvements to the displacement transducer disclosed in the claims can be attained. By disposing a leaf spring between the object to be measured and the measuring short-circuit ring, any lasting deformation which might be caused by unintentional impacts is prevented. If the leaf spring is embodied as a bimetallic spring, then it can serve the supplementary or even the exclusive purpose of compensating for temperature changes. An adjusting element engaging the leaf spring permits the fine adjustment of the displacement transducer.

The invention will be better understood and further objects and advantages thereof will become more apparent from the ensuing detailed description of preferred embodiments taken in conjunction with the drawings.

BRIEF DESCRIPTION OF THE DRAWINGS

FIG. 4 is a section view taken along the line IV—IV of FIG. 2; and

FIG. 5 shows on an enlarged scale, a further form of embodying a measuring short-circuit ring with a leaf spring.

DETAILED DESCRIPTION OF THE PREFERRED EMBODIMENTS

Figure 1:
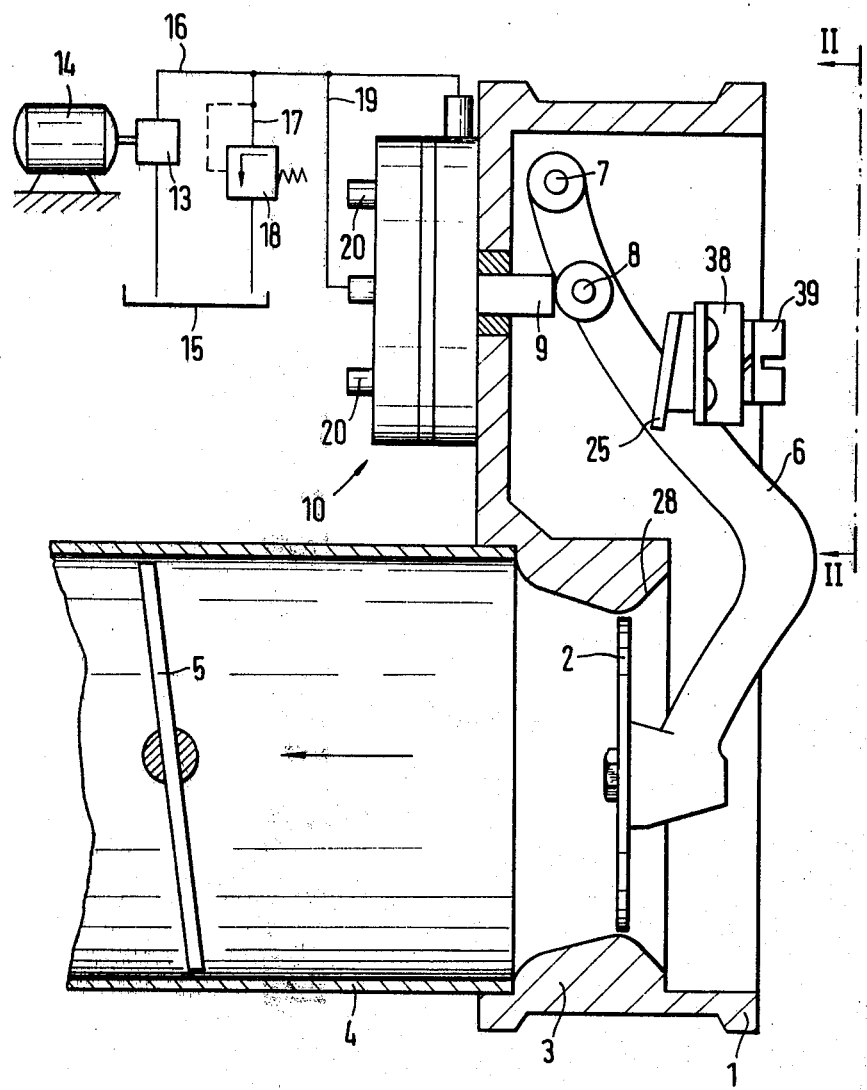
FIG. 1 shows a cross-sectional view of a fuel injection system having an air flow rate meter and a measuring short-circuit ring disposed thereon in accordance with a preferred embodiment of the invention.

In the fuel injection system shown in FIG. 1 and intended for use in a mixture-compressing internal combustion engine with externally supplied ignition, the air aspirated by the engine for the purpose of combustion flows through an air filter, not shown, into an air flow rate meter housing 1. In the direction of the arrow, the air then flows past an air flow rate meter 2 suspended in a pivotable manner and on through a conical section 3, via an intake tube section 4 having an arbitrarily actuatable throttle valve 5, to one or more cylinders, not shown, of the engine. The air flow rate meter 2 is represented as a plate disposed transversely to the flow direction and secured approximately at its middle to a pivot lever 6. The pivot lever 6 is pivotable in one plane about a rotary point 7. The movement of the air flow rate meter 2 within the conical section 3 occurs in accordance with a particular law, so that it represents an approximately linear function of the flow rate of air through the intake tube. For a constant restoring force exerted upon the air flow rate meter and a constant air pressure prevailing before the air flow rate meter, the pressure prevailing between the air flow rate meter and the throttle valve also remains virtually constant.

The air flow rate meter 2 acts via a pivot lever 6 and a roller 8 directly upon a control slide 9 of a metering and quantity distributing valve 10. The supply of fuel can be effected via a fuel pump 13, which is driven by an electromotor 14 and aspirates fuel from a fuel container 15, supplying it via a line 16 to the metering and quantity distributing valve 10. A return flow line 17 branches off from the line 16 and includes a pressure limiting valve 18. The end face of the control slide 9 remote from the pivot lever 6 is exposed via a line 19 also branching off from the line 16 to the fuel, which is under constant pressure and thus acts in a known manner as a restoring force exerted upon the air flow rate meter 2.

Upon a pivoting movement of the pivot lever 6 in the direction of flow of the aspirated air, the air flow rate meter 2 is moved into the conical section 3 of the intake tube, so that the varying cross section between the air flow rate meter 2 and the funnel-like section is proportional to the displacement of the air flow rate meter. If this is made a precondition, then there is a linear dependence of the adjustment movement of the air flow rate meter 2 and the displacement movement of the control slide 9, so that for the air mass flowing through the intake tube a proportional quantity of fuel is always metered. The metered quantity of fuel proceeds from the metering and quantity distributing valve 10 via channels 20 to the individual injection valves, not shown, which are disposed in the vicinity of the engine cylinders.

Figure 3:
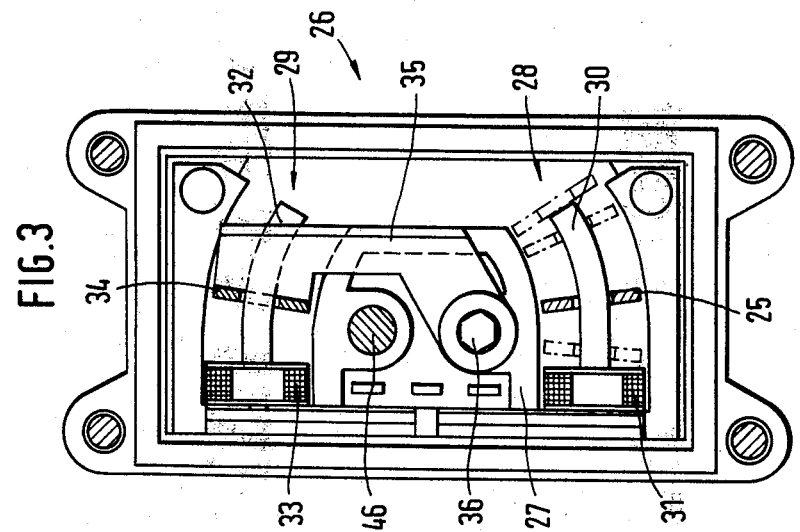
FIG. 3 is a section view taken along the line III—III of FIG. 2.

Because the position of the air flow rate meter 2, that is, of the pivot lever 6, is proportional to the fuel quantity metered at the control slide 9, the fuel consumption of the engine can be determined by means of ascertaining the position of the air flow rate meter 2 or of the pivot lever 6. To this end, a measuring short-circuit ring 25 can be connected for instance with the pivot lever 6, the measuring short-circuit ring 25 being part of an inductive displacement transducer 26 shown in greater detail in FIGS. 2 and 3. Turning now to FIG. 3 the inductive displacement transducer 26 has a core 27, which is made up of two symmetrically arranged, E-shaped sets of arms 28, 29, that is, a measuring arm set 28 and a reference arm set 29. On the middle arm 30 of the measuring arm set 28, a measuring magnetic coil 30 is disposed on one end and on the other end, the middle arm is surrounded by the measuring short-circuit ring 25 connected to the pivot lever 6. The middle arm 32 of the reference arm set 29 is surrounding on one end by a reference magnetic coil 33 and on the other end by a fixed reference short-circuit ring 34. The reference short-circuit ring 34 is secured on a lever 35, which is pivotably supported on a rotary axis 36, embodied by way of example by a screw 36. The reference arm set 29 having the reference magnetic coil 33 and the reference short-circuit ring 34 serves the purpose of compensating for temperature errors on the part of the displacement transducer. As a rule, the reference short-circuit ring 34 is held for this purpose in an approximately central position within its pivoting range on the middle arm 32, for instance by means of tightening the screw 36 when the reference short-circuit ring 34 is located in such a position.

Figure 2:
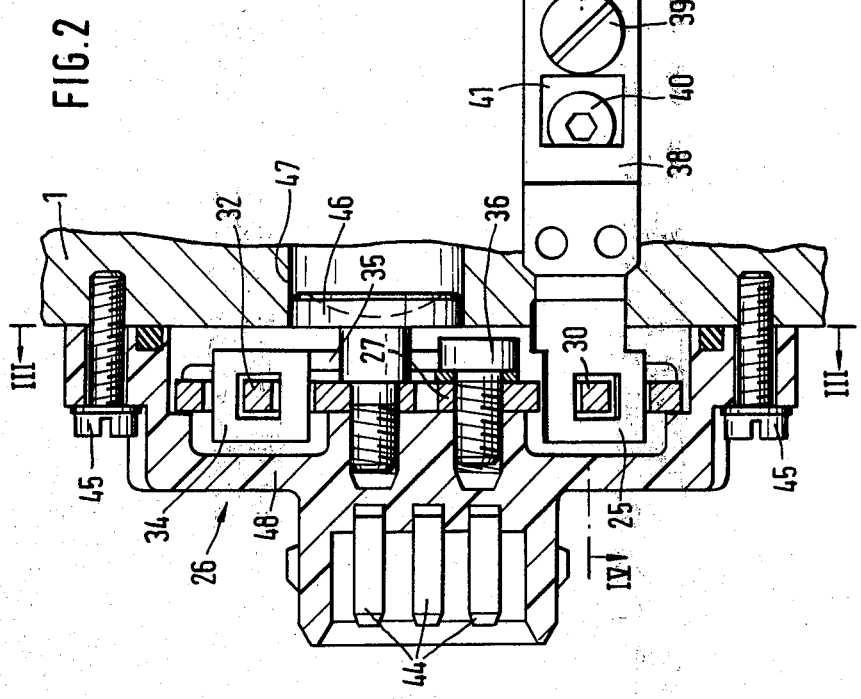
FIG. 2 shows in cross section one arrangement of a displacement transducer in accordance with the invention on the housing of an air flow rate meter in a view taken along the line II—II of FIG. 1.

As is shown in the drawing of FIG. 2, the measuring short-circuit ring 25 is connected to a leaf spring 38, for instance being riveted therewith, and the leaf spring 38 in turn is secured on the pivot lever 6 of the air flow rate meter 2 by means of a securing screw 39. The disposition of the leaf spring 38 has the advantage that in case of unintentional impacts against the measuring short-circuit ring 25, lasting deformations are prevented. As is also shown in FIG. 4, an adjusting screw 40 can also engage the leaf spring 38 in order to adjust the measuring short-circuit ring 25, being supported on the other end of the pivot lever 6. For better access to the adjusting screw, an aperture 41 can be provided in the leaf spring 38. The embodiment of the aperture 42 in the manner shown in FIG. 5 appears to be particularly advantageous. Here, the apparatus 42 at least partially surrounds the securing screw 39 by means of protrusions 43, 44 on the side of the aperture remote from the adjusting screw 40; as a result, the lever ratio for the adjusting screw 40 is higher, and the measuring short-circuit ring 25 can be more sensitively adjusted relative to the measuring arm set 28. It can also be advantageous to replace the leaf spring 38 with a bimetallic spring, which serves to provide a supplementary means of temperature compensation or, in certain cases, makes the temperature compensation at the reference arm set 29 superfluous.

The inductive displacement transducer is connected to a source of electric current via insertion lugs 44'. The inductive displacement transducer 26 is secured on the air flow rate meter housing by screws 45, for example, and it may be centered in position by means of a centering screw 46 whose head protrudes into a centering aperture 47 of the air flow rate meter housing 1. The inductive displacement transducer 26 is preferably surrounded by a plastic housing 48.

The inductive displacement transducer 26 according to the invention is embodied as an angle transducer; that is, the two arm sets 28, 29 are embodied in the form of a circular arc such that they permit a pivoting movement on the part of the respective short-circuit rings 25, 34 about a rotary axis. To this end, not only are the middle arms 30, 32 embodied as circular arcs, but the flanking arms of each arm set are so embodied as well. The rotary axes of the short-circuit rings 25, 34 need not be located in the axis of symmetry of the inductive displacement transducer 26 or of the two arm sets 28, 29; instead, it may be advantageous for reasons of saving space for the radii of rotation to overlap one another. Thus in the inductive displacement transducer 26 according to the invention the rotary axis of the measuring short-circuit ring 25 is located in the axis of the centering screw 46 and the rotary axis of the reference short-circuit ring 34 is located in the axis of the screw 36.

The mode of operation of the inductive displacement transducer 26 is known per se; however, it will be discussed briefly here. Between the arms of the arm sets 28, 29, the magnetic coils 31, 33 generate a homogeneous alternating field. The short-circuit rings 25, 34 act as a short-circuit winding for each arm set 28, 29, so that no alternating magnetic field can pass through the short-circuit ring 25, 34. The total magnetic flow is thus limited in a manner which closely approximates being proportional to the displacement. According to the law of induction, the inductivity of the magnetic coils 31, 33 is therefore likewise varied in a displacement-proportional manner. The E-shaped embodiment of the arm sets 28, 29 results in a high degree of measurement sensitivity on the part of the inductive displacement transducer 26.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An inductive displacement transducer for conversion of a mechanical movement into an electrical signal which in accordance with an arbitrarily predeterminable function depends on the movement of the object to be measured, in particular an air flow rate meter disposed in the intake tube of an internal combustion engine comprising at least one magnetic coil of ferromagnetic material disposed on a core, the inductivity of which magnetic coil is variable by means of a short-circuit ring displaceable on the core in accordance with the movement of the object to be measured, the core of the displacement transducer being made up of two E-shaped sets of arms disposed symmetrically relative to one another, one arm of which set acts as the measuring arm set, the middle arm of which is surrounded on one end by a measuring magnetic coil and on the other end by a measuring short-circuit ring connected with the object to be measured and the other arm set acts as the reference arm set, the middle arm of which is surrounded on one end by a reference magnetic coil and on the other end by a fixed reference short-circuit ring.

2. An inductive displacement transducer as defined by claim 1, wherein the two arm sets are embodied in such a manner that they permit a pivoting movement of the respective short-circuit rings about a rotary axis.

3. An inductive displacement transducer as defined by claim 2, wherein the rotary axes of the measuring short-circuit ring and the reference short-circuit ring are different from one another, the radii of rotation in particular overlapping one another.

4. An inductive displacement transducer as defined by claim 1, wherein the measuring short-circuit ring is connected with a leaf spring secured on the movable object to be measured.

5. An inductive displacement transducer as defined by claim 4, wherein a bimetallic spring acts as the leaf spring.

6. An inductive displacement transducer as defined by claim 4, wherein an adjusting element engages the leaf spring between the securing means on the object to be measured and the measuring short-circuit ring, the adjusting element being supported on the other end on the object to be measured.

7. An inductive displacement transducer as defined by claim 6, wherein in the region of the securing means of the leaf spring on the object to be measured and of the adjusting element, the leaf spring is provided with an aperture, which at least partially surrounds the securing means.

* * * * *